Jan. 7, 1941.   W. J. BORER ET AL   2,227,998

ROTARY ENGINE

Filed June 4, 1938

INVENTORS
Warren E. George
BY William J. Borer

Philip A. Terrell
ATTORNEY

UNITED STATES PATENT OFFICE 2,227,998

ROTARY ENGINE

William J. Borer and Warren E. George,
Tekemah, Nebr.

Application June 4, 1938, Serial No. 211,878

3 Claims. (Cl. 74—60)

The invention relates to mechanical movements, and has for its object to provide a device of this character comprising opposed arcuate cylinders, concentrically arranged in relation to each other and on opposite sides of a driven shaft and to provide an oscillating frame having its ends between arcuate pistons in the cylinders and in which frame a diagonal crank of the driven shaft is rotatably mounted, and is adapted to be rotated as the frame is oscillated by the pistons in the cylinders.

A further object is to provide a central bearing on the diagonal crank in axial relation to the driven shaft, and a member on said bearing having arcuate link connections in the plane of the pistons and to the member at a right angle to the plane of the pistons.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
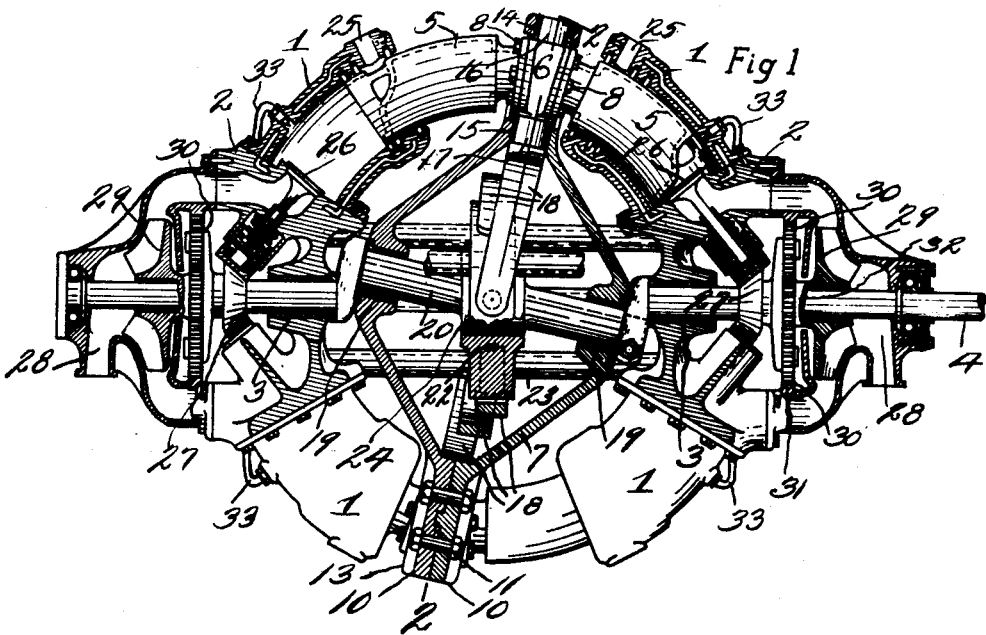
Figure 1 is a vertical longitudinal sectional view through the engine.
Figure 2:
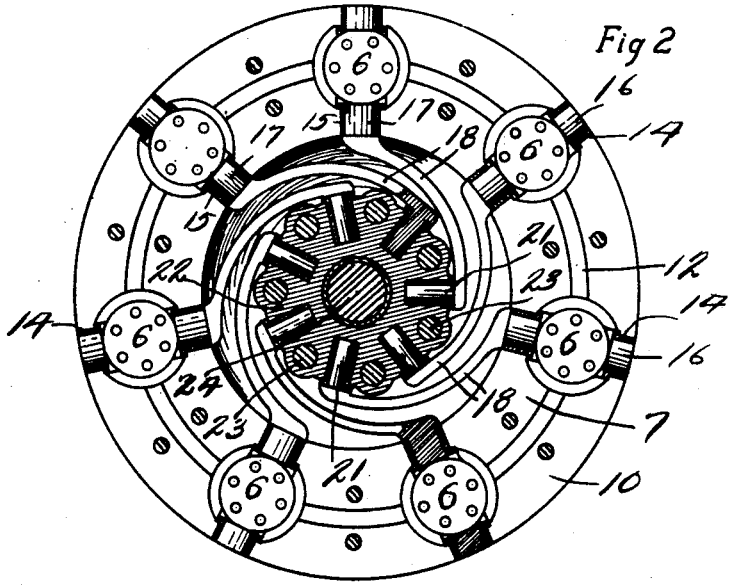
Figure 2 is a vertical transverse sectional view taken on line 2—2 of Figure 1.

Referring to the drawing, the numeral 1 designates arcuate cylinders concentrically arranged. It will be noted the cylinders are in pairs, and referring to Figure 2, it will be noted seven pairs of cylinders are used. The cylinders 1, at opposite sides of the engine, are connected together by members 2, having bearings 3, in which the driven shaft 4 is mounted.

Slidably and reciprocally mounted in the cylinders 1 are pistons 5, the adjacent ends of which are connected to the wedge shaped heads 6 carried by the rockable member 7 by means of bolts 8. The rockable member 7 is round and is provided with flanges 10 connected together by means of bolts 11. A locating rib 12 is preferably provided. It will be noted that the flanges 10 are provided with registering semicircular shaped portions 13, forming bearings 14 and 15 for the bosses 16 of the wedge shaped head 6 and the bosses 17 of the arcuately shaped pivoted arms 18. The rockable casing 7 is provided with alined bearings 19, and in which is rotatably mounted the angular positioned crank 20 of the driven shaft 4. It will be seen that, as the pistons 5 move inwardly and outwardly in the cylinders 1, there will be a wobbling action, and the bearings 19 will impart a continuous rotation to the angular positioned crank 20.

It will be noted that the arcuate arms 18 have pivot lugs 21, pivotally mounted in the stationary block 22 at a right angle to their pivot lugs 17. Hence it will be seen that the rockable member 7 may wobble during the wobbling of the crank 20. The block 22 is supported on transverse rods 23, which connect the cylinder connecting members 2, and the rods 23 may extend through apertures in the rockable member 7. The block 22 is mounted on a bearing member 24 carried by the crank 20, and this bearing member is in axial relation to the driven shaft 4. Therefore it will be seen that the arcuate arms 18 will be maintained in proper relation during the operation of the engine.

Exhaust gases are released through piston 5 operated ports 25 in base of cylinder 1. The heads of the cylinders are provided with intake ports controlled by valves 26, and the inlet valves are operated by means of rotatable cams 27, carried by the shaft 4, so the intake air or air and gases may be drawn through the intake manifold 28 and forced into the cylinder 1. Shaft 4 is preferably provided with fans 29 for rapidly forcing in the inlet air or air and gases, and which fans are driven by planetary gears 30, which mesh with internal gears 31, and with the fan gears 32, therefore it will be seen that during the operation of the engine the inlet air or air and gases will be forced into the cylinders as the intake valves 26 are momentarily opened. Fuel is supplied when the air in cylinders 1 is compressed by piston 5 by the properly timed fuel injector 33.

From the above it will be seen that an oscillating rotary motor is provided, which is simple in construction, and one wherein a diagonal crank shaft is rotated continuously in one direction by a wobbling operation of a piston actuated frame, which imparts rotary movement to the ends of the diagonal crank. It will also be seen that the engine is compact, positive in its operation, and the parts reduced to a minimum.

The invention having been set forth what is claimed as new and useful is:

1. The combination with concentrically arranged pairs of cylinders, pistons in said cylinders, a driven shaft, a diagonal wobbler crank carried by said shaft, of a wobbler frame mounted on the wobbler crank and having bearings at the ends of said crank, the outer sides of said wobbler frame being pivotally connected to adjacent pistons, a bearing block within the wobbler frame between the bearing of said frame, a bearing carried by the wobbler crank within the wobbler frame and axially of the driven shaft and arcuate arms hingedly connected to the block and extending around the block and having bearing connection to the frame at the point of connection of the pistons with each other, and at a right angle to the hinged connection of the arms to the block.

2. The combination with a wobbler frame of a mechanical movement having a diagonal wobbler crank, of a bearing on said crank axially of a driven shaft, a block within the wobbler frame and in which said bearing is rotatably mounted, means for supporting the block and arcuate arms connected to the block and to the wobbler frame and on bearings at right angles to each other.

3. A mechanical movement comprising cylinders, pistons in said cylinders, said pistons and cylinders being concentrically arranged, a driven shaft, a wobbler frame between the cylinders and oscillated by the piston, a diagonal crank carried by the driven shaft and on the ends of which the wobbler frame is mounted, a bearing block within the wobbler frame and rotatably mounted on the crank, supporting means extending through the wobbler frame and supporting the block from the outside of said frame, a bearing carried by the diagonal crank axially of the driven shaft and on which the block is mounted and arcuate arms hingedly connected to the block at spaced points and to the wobbler frame at spaced points at right angles to each other.

WILLIAM J. BORER.
WARREN E. GEORGE.